United States Patent Office 3,224,892
Patented Dec. 21, 1965

3,224,892
HIGH SURFACE AREA ALUMINUM SILICATE AND
METHOD OF MAKING SAME
Glen A. Hemstock, East Brunswick, N.J., assignor to
Minerals & Chemicals Philipp Corporation, Menlo
Park, N.J., a corporation of Maryland
No Drawing. Filed July 27, 1962, Ser. No. 213,039
12 Claims. (Cl. 106—288)

This application is a continuation-in-part of my copending application, Serial No. 852,168, filed November 12, 1959, now abandoned.

The present invention relates to a method of hydrothermally treating kaolin clay to effect the transformation of kaolin clay into a novel aluminum silicate product which is chemically similar to its kaolin clay precursor, but which possesses materially different physical properties. The product of the invention is useful in applications for which naturally occurring gaolin clay is unsuited as well as being more beneficial in some applications in which kaolin clay is presently used.

Kaolin clay is a hydrous aluminum silicate which may be represented by the empirical formula:

$$Al_2O_3 \cdot 2SiO_2 \cdot 2H_2O$$

The term "kaolin clay" encompasses those clays which contain as the principal mineral constituent kaolinite, as well as those containing nacrite, dickite and anauxite, all of which are represented by the formula given above. Kaolin clays are two-layered minerals and are distinctly crystalline. The theoretical water of crystallization of kaolin clay is 13.9%, water of crystallization being calculated as follows:

Percent water of crystallization=$\left(\dfrac{\text{L.O.I.}-\text{F.M.}}{100-\text{F.M.}}\right) \times 100$ Normally the water of crystallization of kaolin clay is somewhat less than theoretical, such as 13.6–13.8%. "L.O.I." in the equation represents loss on ignition which is determined by heating the clay to constant weight at 1000° C. "F.M." represents free moisture which is determined by heating the clay to constant weight at 105° C.

Kaolin clay can be readily dehydrated by calcination. The dehydrated clay may be rehydrated and recrystallized, as is known to those skilled in the art. The equilibrium may be represented by the equation:

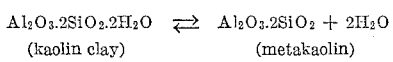

$Al_2O_3 \cdot 2SiO_2 \cdot 2H_2O \rightleftarrows Al_2O_3 \cdot 2SiO_2 + 2H_2O$
(kaolin clay)　　　　　(metakaolin)

Kaolin clay is widely used in the formulation of diverse compositions, e.g., as a pigment in the paper coating industry, and as a pigment or extender in paints, white rubber goods and plastics. Certain electrophoretically refined kaolins (so-called "osmo-kaolins") are used in antidiarrhetic pharmaceutical formulations, usually together with pectin. Koalin clays are also used as diluents in solid agricultural toxicant formulae.

The use of kaolin clay is limited, however, to those applications in which a material of low surface area is required, since kaolin clay has a low surface area as compared with the surface areas of many other clay minerals, insoluble silicates and oxides. Surface area is a property which at least partly determines the adsorptive capacity of a material. A typical sample of kaolin clay has a surface area of only about 5 to 15 square meters per gram, as measured by the B.E.T. nitrogen adsorption method hereafter described. The clay mineral attapulgite, on the other hand, has a surface area of about 200 to 220 square meters per gram, and a typical sample of a swelling bentonite has a total surface area of approximately 1000 square meters per gram. As a result of its low surface area, kaolin clay has limited utility as a carrier for active agricultural ingredients, in which use an active agricultural ingredient, such as an organic toxicant, is sorbed on a mineral carrier. The ability of kaolin clay to adsorb large organic molecules such as bacterial toxins is also limited. For many years the pharmaceutical industry has screened inorganic solid sorbents on the basis of methylene blue adsorption values, it having been determined that the capacity of a material to sorb toxins and the like is correlated with the methylene blue adsorption value of the material. Kaolin clay as mined and conventionally refined by air or hydraulic classification has a methylene blue adsorption value (as determined by the method hereafter described) of only about 0 to 1.0%. For this reason, the pharmaceutical industry has recently made commercially available antidiarrhetic medicines formulated with attapulgite clay which has a higher methylene blue adsorption value (about 75% to 80%) and higher surface area than kaolin clay.

Still another characteristic of kaolin clay is its low base-exchange capacity. "Base-exchange capacity" (or cation-exchange capacity) may be defined as the ability of a material to exchange its cations for the cations of another compound and is usually measured in milliequivalents per 100 grams of material. The base-exchange capacity of Wyoming bentonite and attapulgite clay are typically about 100 and 25 meg./100 gm., respectively, whereas the base-exchange capacity of kaolin is only about 3 to 5 meg./100 gm.

Although many minerals of high surface area and/or high methylene blue adsorption value are commercially available, few are as abundant in nature or as pure chemically and as bright and white as kaolin clays, which as mentioned are essentially pure aluminum silicates.

Accordingly, a principal object of the subject invention is the provision of a simple, inexpensive method of increasing the surface area of kaolin clay so as to provide a versatile material useful in many applications for which kaolin clays as found in nature are unsuited and to render the clay more useful in certain applications in which kaolin clay is presently employed.

A more specific object of my invention is the provision of a method of increasing the surface area of kaolin clay to a value of at least 150.

Another object of my invention is the transformation of kaolin clay into a novel hydrated aluminum silicate of substantially the same chemical analysis as kaolin clay but which possesses materially different physical properties.

A more particular object of the invention is the provision of a method of improving the methylene blue absorption value of kaolin clay so as to improve its utility as an adsorbent ingredient in a pharmaceutical preparation designed to combat gastrointestinal disorders.

Further objects and advantages of my invention will be readily apparent from the description thereof which follows.

The present invention contemplates the formation of a novel finely divided aluminum silicate of high surface area by subjecting dehydrated kaolin clay (metakaolin) to hydrothermal treatment under conditions of superatmospheric pressure and time selected to restore a major proportion, but not all, of the water of crystallization to the dehydrated clay while minimizing the normal tendency of the dehydrated clay to recrystallize during hydrothermal treatment. In other words, the hydrothermal treatment step is conducted under conditions favoring restoration of most of the water of composition to the metakaolin structure but which inhibit in the rehydrated aluminum silicate any increase of crystallite size sufficient to provide a material which has an X-ray diffraction pattern characteristic of kaolin clay. Thus, this invention contemplates a rehydration reaction which does not follow the familiar reversion of metakaolin to kaolin by restoration of 2 mols of water to a mol of metakaolin to form rehydrated, recrystallized kaolin (as indicated by the equilibrium above). Instead the rehydration proceeds in a different fashion to produce a rehydrated material which is physically very different from both kaolin clay and dehydrated kaolin clay.

The reaction involved in accordance with my invention may be summarized by the following equations:

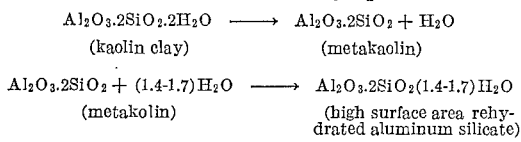

$$Al_2O_3.2SiO_2.2H_2O \longrightarrow Al_2O_3.2SiO_2 + H_2O$$
(kaolin clay) (metakaolin)

$$Al_2O_3.2SiO_2 + (1.4\text{-}1.7)H_2O \longrightarrow Al_2O_3.2SiO_2(1.4\text{-}1.7)H_2O$$
(metakolin) (high surface area rehydrated aluminum silicate)

For convenience sake, the water of composition of the rehydrated product is referred to as "water of crystallization" although the rehydrated product appears to be virtually amorphous in that the characteristic kaolin X-ray diffraction lines are greatly reduced in intensity.

The preferred method for producing a high surface aluminum silicate, in accordance with this invention, involves the steps of calcining kaolin to form metakaolin, slurrying the cooled pulverized metakaolin with water and then subjecting the slurry to hydrothermal treatment under conditions of high pressure saturated steam and for a time preselected to produce a hydrated aluminum silicate having a water of composition analysis within the range of 10% to 12% (which is less than the water crystallization of 13.6% to 13.8% for a typical kaolin). I have found that it is essential to the transformation of the kaolin clay into a hydrous aluminum silicate of optimum surface area (as well as methylene blue adsorption value and base-exchange capacity) to thus control the content of water of crystallization in the rehydrated product under the processing conditions employed. Further, it has been found that the desired results depend on subjecting the dehydrated kaolin to the action of the steam while the dehydrated clay is in the form of an aqueous slip or slurry, that is, while the dehydrated clay is immersed in liquid water. It has been discovered, most unexpectedly, that rehydration of dehydrated kaolin with saturated steam to a value within the desired range of 10% to 12% did not result in a high surface area product when the dehydrated kaolin was not slurried with the water in the autoclave before being subjected to the hydrothermal treatment. Moreover, it is essential to cool the calcined clay prior to hydrothermal treatment of the calcined clay since hydrothermal treatment of hot metakaolin will not produce the desired high surface area product, but rather favors recrystallization and reformation of kaolinite.

A consideration of the surprising and unexpected discovery that the surface area attainable under hydrothermal conditions was independent of the dehydration temperature, as well as steam pressure and reaction time, but was related to the presence of liquid water with the metakaolin during hydrothermal treatment, to the amount of water of crystallization recovered in the hydrothermal treatment and to the amount of crystal structure obtained as measured by the intensity of the 12.5° 2θ line on the X-ray diffraction pattern, suggests the following explanatory hypothesis. The rearrangement of the crystal which results in surface area development is predominated over at higher levels of water of crystallization restitution by a second reaction which results in a reduced surface area. It seems likely that this second reaction which results in a reduced surface area of the crystal represents a reorganization of the crystal and is inhibited by the presence of liquid water with the metakaolin during the initial stages of the rehydration process.

My invention may also be practiced using pressed cakes of metakaolin and such pressed cakes may be prepared by calcining mechanically compressed kaolin clay or by mechanically compressing finely divided metakaolin, preferably the former. However, it will be noted that clay which has been pressed (e.g., pelleted) before or after calcination does not necessarily respond to hydrothermal treatment as does pulverized clay and the desired high surface area product is obtained from pressed clay with high pressure saturated steam only when the density of the pressed product is between about 1.1 and 1.5 grams per cubic centimeter and hydrothermal conditions preselected to restore about 8.5% to about 12% water of crystallization to the dehydrated material.

The product provided by the steps briefly described has a surface area of 120 to 300 square meters per gram or more; a methylene blue adsorption value of at least about 50% and more usually up to 95% or higher; and a base-exchange capacity of 19 to 30 milliequivalents per 100 grams or more. Thus, the methylene blue adsorption value has been substantially increased over that of raw kaolin clay and the surface area has been increased 10 to 20-fold or more.

The product of my invention is useful in many applications for which kaolin clay or calcined kaolin clay are unsuited. One important use of the material produced in accordance with the present invention is as an adsorbent ingredient in pharmaceutical preparations intended for oral ingestion (for example, in an antidiarrhetic formulation) in which case the exceptionally high methylene blue adsorption value of the hydrated aluminum silicate renders the material more potentially effective as a detoxicant than either naturally occurring kaolin clay or kaolin refined by electrodialysis (which has a methylene blue adsorption value of 15% to 18%). Another use of the material is as a carrier for toxicants in which case the higher surface area should increase the quantity of active ingredient sorbable on the clay.

I am well aware that hydrothermal treatment of kaolin clay has been attempted by many workers in the prior art. In general, the objectives of such treatment were academic in nature. Apparently none of these investigators, prior to my surprising and unexpected discovery, conducted their experiments using a combination of steps which could result in the production of the high surface area aluminum silicate of this invention. By way of example, J. S. Laird and coworkers subjected various calcined clays to the action of high pressure steam and studied the effect of the combined calcination and steam treatment on the plasticity of the clay. In one experiment, a calcined Florida kaolin was rehydrated with saturated steam at 800 p.s.i.g. to a water content of 11%. Laird et al. reported that the rehydrated material resembled the starting clay. I have confirmed Laird et al.'s observation and have found that when calcined kaolin clay is partially rehydrated with water to about 11% without slipping the clay the rehydrated clay resembles the starting clay, having a low surface and well-crystallized structure as compared with the aluminum silicate product of this invention. Other workers produced poorly ordered rehydration products; however, such products contained only very small quantities of water of hydration. Still other investigators have concentrated on the effect of calcination temperature during dehydration upon certain properties of rehydrated clay and have found calcination temperature to be correlated with the firing shrinkage characteristics of the rehydrated material. In contrast, I have found calcination temperature is critical only to the extent that the temperature must be high enough to effect complete conversion of the hydrous clay to metakaolin.

More specifically, the clay I employ in my process is preferably, for reasons of economy, raw kaolin clay which has been refined only to the extent that grit (i.e., particles coarser than 44 microns), and undispersible agglomerates are removed. Coarse or fine fractions of clay may also be used, if desired. My invention is not limited to the use of such clay since clays which have received other preliminary treatment, such as deironing or other beneficiation, may be used provided such treatment does not entail appreciable removal of alumina or silica from the clay.

The clay I employ is pulverized to the extent that it is all finer than about 325 mesh. The crushed clay is initially calcined to eliminate substantially the water of crystallization. The water of crystallization of the calcined product should not be more than about 2% to obtain the maximum benefit of the subsequent hydrothermal treatment. In practice, difficulty may be experienced in eliminating completely water of crystallization, and a water of crystallization of about 0.2% to 0.5% by weight in the metakaolin may be as low as can be practically attained.

Calcination is carried out in air or steam, at atmospheric pressure or under vacuum, if desired. The temperature at which calcination is conducted, provided it is sufficient to effect substantial dehydration and is below that temperature at which the kaolin exotherm occurs (940–980° C.), appears to have no observable effect on the surface area of the rehydrated product. Calcination periods will usually fall within the limits of about ½ hour to 20 hours or more at temperatures of from about 450° C. to about 900° C. Calcining at temperatures below about 450° C. does not result in adequate loss of water of crystallization from the clay, even if calcination time is prolonged. When the clay is calcined above about 900° C. for a time sufficient to permit the kaolin exotherm to take place a profound change in the morphology of the calcined product occurs and pure metakaolin is not produced. Instead, a very dense material, believed by some authorities to be incipient mullite, is produced and this material is not amenable to the hydrothermal treatment hereafter set forth.

The kaolin structure is substantially destroyed by the calcination as is evidenced by the absence of characteristic kaolin lines in the X-ray diffraction pattern of the calcined product.

The calcined intermediate product is cooled prior to hydrothermal treatment, since I found that when the hot metakaolin is subjected to hydrothermal treatment so as to restore the controlled amount of water of crystallization the product does not have the high surface area of the material produced when the metakaolin is cooled before hydrothermal treatment. Cooling is conducted in air or inert atmosphere until the metakaolin reaches ambient temperature or somewhat higher, but below about 125° C.

An aqueous slip of metakaolin is then prepared. The solids content of the slip may vary widely and good results have been realized operating with slips as dilute as 10% solids (based on the composition weight) or as concentrated as 50% solids. More dilute slips may be used although for practical reasons slips less concentrated than 10% are not recommended. Slips more concentrated than 50% clay solids are difficult to pump and, moreover, as the calcined clay composition approaches the bone dry state, the surface area obtainable by high pressure saturated steam treatment decreases in effectiveness. Apparatus and procedures for preparing clay slips are well known to those skilled in the art.

The clay, in the form of an aqueous slip or paste, is subjected to hydrothermal treatment with saturated high pressure steam under conditions of time selected to restore water of crystallization to the dehydrated aluminum silicate in the amount within the limits of 10% to 12%, which as noted above is less than the theoretical water of crystallization of naturally occurring kaolin clay. Any suitable pressurized equipment provided with means for introducing and controlling pressurized steam may be employed. The hydrothermal treatment is carried out by directly contacting the metakaolin slip with saturated steam at temperatures from about 325° F. up to but not including the critical temperature of water (i.e., 706° F.). The desired results are not obtained using superheated steam. Since rehydration will be appreciably more rapid operating with saturated steam at relatively high pressure, the preferred hydrothermal treatment is conducted with saturated steam at or above 500 p.s.i.g. For example, the desired degree of rehydration will be accomplished operating under the following approximate operating conditions using steam at saturation temperature: 300 p.s.i.g., for 60 hours; 400 p.s.i.g., for 28 hours; 500 p.s.i.g., for 20 hours; 800 p.s.i.g., for 6 hours; 1000 p.s.i.g., for 3 hours; 1200 p.s.i.g., for 1½ hours; 1400 p.s.i.g., for 30 minutes; and 1600 p.s.i.g., for 0 minutes. Some variation from these values may be necessary with metakaolins of different origin. For example, with some metakaolins, treatment at 800 p.s.i.g., for 6 hours may fully rehydrate the calcined clay and a shorter steaming time will be necessary. Time conditions refer to time after the reaction vessel reaches the indicated saturated steam pressure.

The rehydrated aluminum silicate thus obtained may be used as such or may be further refined as by chemical bleaching, flotation, acid treatment, etc., in accordance with methods known to those skilled in the art.

The following examples are given to explain more fully my invention.

In the examples, methylene blue absorption values were determined by adding increments of distilled water to 5.0 cc. of 0.40% methylene blue solution until the color of the standard thus prepared matched that of the diluted supernatant liquid withdrawn from a test sample. The test samples were prepared by mixing 1.0 gram of dry test material, 13 cc. of a 0.4% methylene blue solution and 77 cc. of distilled water, shaking the suspension for 30 minutes, centrifuging the suspension for 15 minutes, decanting supernatant liquid and diluting it with 20 cc. of distilled water. Samples were compared by holding samples close to a soft fluorescent light source. The methylene blue adsorption values were reported as a percentage of the total methylene blue adsorbed.

X-ray powder diffraction patterns were obtained by standard procedures using copper K α X-radiation (wave length=1.5405 A.).

Surface areas reported in the examples are so-called "B.E.T." values, determined by a nitrogen adsorption method described by S. Brunauer, P. H. Emmett and E. Teller in their article entitled "Adsorption of Gases in Multi-Molecular Layers," on page 309 of Journal of the American Chemical Society, Vol. 60, February 1938, using the molecular size data of H. K. Livingston presented in his article entitled "Cross-Sectional Areas of Molecules Adsorbed on Solid Surfaces," on page 569, Journal of the American Chemical Society, Vol. 66, April 1944.

The time values reported in the examples refer to time after the reaction vessel reached the indicated steam pressure.

EXAMPLE I

Experiments were carried out to correlate the relationship between B.E.T. surface area and water of crystallization of rehydrated metakaolin produced by hydrothermal treatment of an aqueous slip of metakaolin under varying conditions of saturated steam pressure and time.

The starting clay used in the experiments was a water-washed degritted unfractionated kaolin clay from a mine near McIntyre, Georgia. The clay was composed primarily of well-crystallized kaolinite. The surface area of the starting clay was about 14 m.$^2$/gm. and the percent water of crystallization was 13.71%. The surface area of the metakaolin produced from this clay was about the same as the kaolin clay from which it was produced, and the percent water of crystallization was about 0.2%.

Rehydrated aluminosilicate products were prepared as follows. The kaolin clay was pulverized in a high speed hammer mill and calcined in a preheated muffle furnace at 700° C. for 4 hours to produce metakaolin. The metakaolin was cooled to room temperature and fractions of the cooled product were made into 10% to 50% solids aqueous slips. Fractions of the slips were placed in a 1100 cc. capacity stainless steel bomb to which about 100 ml. of distilled water had been added. The base of the container was supported on and maintained in an upright position by the base of the autoclave. Runs were made with saturated steam at pressures of 400 to 3200 p.s.i.g. for various periods of time. The desired steam pressure was obtained by means of a portable West Controller and a chromel-alumel thermocouple.

Specific rehydration conditions employed in the production of many of the rehydrated materials are set forth in subsequent examples.

It was found that there was a direct correlation between B.E.T. surface area and water of crystallization of the rehydrated metakaolin. Also observed was that the B.E.T. surface area obtainable was dependent on the quantity of water of crystallization in the rehydrated product, rather than the particular saturated steam pressure employed. The B.E.T. surface area of the rehydrated metakaolin increased from a value of about 30 m.$^2$/gm. at a water of crystallization of about 3.8% up to a value of about 150 at the 10% water of crystallization level. With increment of water of crystallization beyond 10%, the B.E.T. surface area increased sharply to an optimum level of at least 300 m.$^2$/gm. when the water of crystallization fell within the range of about 11.1% to 11.6%. B.E.T. surface area decreased from 300 m.$^2$/gm. to about 150 m.$^2$/gm. when the water of crystallization was 12.0%. Increase of water of crystallization beyond 12.0% up to about the normal water of crystallization of kaolin clay resulted in a rapid loss of surface area; e.g., metakaolin rehydrated with saturated steam to 13.0% and 13.3% water of crystallization had surface areas of only about 80 m.$^2$/gm. and 40 m.$^2$/gm., respectively.

the results of the series of experiments are summarized in Table I.

From Table I it can be seen that rehydration of calcined kaolin clay, in accordance with my invention (samples 4 to 8) appreciably increases the surface area, cation-exchange capacity and methylene blue adsorption of the clay. Also illustrated is that rehydration to a lower water of crystallization (sample 3) results in material which has a higher surface area, cation-exchange capacity and methylene blue adsorption value than the starting clay; however, the improvement in these properties was but a fraction of the improvement realized when rehydration conditions were selected to restore about 10% to 12% water of crystallization to the calcined clay, in accordance with the method of this invention.

EXAMPLE III

This example illustrates the effect of variation of saturated steam pressure at constant time on the surface area and degree of crystallinity on rehydrated calcined clay.

The starting clay was the degritted, water-washed kaolinitic clay of Example I, which was pulverized, calcined in a muffle furnace, cooled and slipped in water to 30% solids level. Fractions of the slip were bombed using different saturated steam pressures.

X-ray diffraction patterns on the rehydrated clays were obtained and B.E.T. surface areas were determined. In studying the X-ray diffraction patterns only the intensity at 640 counts per second of the 12.5° 2θ (above background) lines were recorded. The 12.5° 2θ line corresponds to the first order basal reflection of kaolinite and can be used as a measure of crystallinity of the rehydrated product.

Time was recorded from the time the reactor reached the desired saturated steam pressure. Hence, 500 p.s.i.g./0 indicates that the power was turned off the unit as soon as 500 p.s.i.g. pressure was attained. Results are tabulated in Table II.

*Table I*

PHYSICAL PROPERTIES OF REHYDRATED CALCINED KAOLIN CLAY

| Sample | B.E.T. surface area, m²/gm. | Water of crystallization,* percent | Cation-exchange capacity, meg./100 gm. | Methylene blue adsorption value, percent |
|---|---|---|---|---|
| (1) Georgia kaolin clay | 14 | 13.71 | 1.5 | 0 |
| (2) #1 Calcined 700° C./1 hr | 14 | 0.2 | 0 | 0 |
| (3) #2 Rehydrated sat. steam at 1,000 p.s.i.g./0 hr | 87 | 7.40 | 10 | 31 |
| (4) #2 Rehydrated sat. steam at 1,200 p.s.i.g./0 hr | 153 | 9.99 | 19 | 55 |
| (5) #2 Rehydrated sat. steam at 1,600 p.s.i.g./0 hr | 161 | 11.7 | 19 | 67 |
| (6) #2 Rehydrated sat. steam at 1,400 p.s.i.g./0 hr | 208 | 11.6 | 23 | 90 |
| (7) #2 Rehydrated sat. steam at 500 p.s.i.g./24 hrs | 297 | 11.36 | 25 | 75 |
| (8) #2 Rehydrated sat. steam at 500 p.s.i.g./12 hrs | 236 | 11.66 | 23 | 54 |

*Calculated as $\frac{(L.O.I.-F.M.)}{(100-F.M.)} \times 100$.

EXAMPLE II

Physical properties of samples of rehydrated metakaolin, produced in accordance with the method of my invention, were compared with those of naturally occurring kaolin clay, metakaolin produced from this clay and metakaolin rehydrated with saturated steam in accordance with the general method of the invention, but to levels of water of crystallization outside the scope of the invention.

The starting clay was a degritted, water-washed Georgia kaolin clay.

In the rehydration experiments, the cooled calcined clay was slipped with water to about 30% solids and fractions of the slip were bombed in the 1100 cc. autoclave with saturated steam under various conditions. Some of

*Table II*

THE EFFECT OF VARIATION IN STEAM PRESSURE (CONSTANT TIME) ON PROPERTIES OF REHYDRATED KAOLIN CLAY

| Rehydration conditions | Percent water of crystallization | X-ray diffraction line intensity, 12.5°2θ | Surface area, m.²/g. |
|---|---|---|---|
| Starting clay | 13.71 | 140 | 14 |
| 500 p.s.i.g./0 hr | 3.92 | 0 | 30 |
| 1,000 p.s.i.g./0 hr | 7.40 | 0 | 87 |
| 1,000 p.s.i.g./2 hrs | 12.4 | 18 | 134 |
| 1,200 p.s.i.g./0 hr | 9.99 | 6 | 153 |
| 1,400 p.s.i.g./0 hr | 11.6 | 13 | 208 |
| 1,600 p.s.i.g./0 hr | 11.7 | 17 | 161 |
| 1,800 p.s.i.g./0 hr | 13.0 | 20 | 120 |

These results indicate that the surface area attainable under hydrothermal conditions was not dependent upon steam pressure or reaction time but upon the quantity of water of crystallization recovered in hydrothermal treatment and upon the amount of crystal structure obtained as measured by the intensity of the 12.5°2θ line.

The results of Table II show that the surface area attainable upon rehydration initially increased sharply with increasing steam pressure (at constant time), reached a maximum and then decreased again.

Also indicated by the results reported in Table II is that hydrothermal conditions which introduced more than about 12% water of crystallization into the metakaolin resulted in a product of relatively low surface area.

EXAMPLE IV

A series of experiments was carried out to ascertain the effect of variation of time duration of hydrothermal treatment at constant saturated steam pressure (500 p.s.i.g.) on the properties of rehydrated kaolin clay. An experiment was also carried out at a somewhat lower saturated steam pressure for a somewhat longer time than employed in experiments conducted at 500 p.s.i.g. Portions of the clay slip of Example III were used in the study, the results of which are reported in Table III.

Table III

THE EFFECT OF VARIATION IN TIME AT CONSTANT SATURATED STEAM PRESSURE ON THE PROPERTIES OF REHYDRATED KAOLIN CLAY

| Rehydration conditions | Percent water of crystallization | 12.5°2θ intensity | Surface area, m.²/g. |
| --- | --- | --- | --- |
| Starting clay | 13.71 | 140 | 14 |
| 500 p.s.i.g./0 hr | 3.92 | 0 | 30 |
| 500 p.s.i.g./4 hrs | 6.82 | 0 | 75 |
| 500 p.s.i.g./8 hrs | 10.30 | 2 | 181 |
| 500 p.s.i.g./12 hrs | 11.66 | 4.5 | 236 |
| 500 p.s.i.g./18 hrs | 11.62 | 7 | 291 |
| 400 p.s.i.g./24 hrs | 11.17 | 11 | 322 |

The results reported in Table II indicate that the surface area realized under hydrothermal conditions depends on the quantity of water of crystallization recovered in the hydrothermal treatment and upon the amount of crystal structure obtained as measured by the intensity of the 12.5°2θ line.

EXAMPLE V

To demonstrate the necessity for (1) using high pressure steam which is saturated and (2) slipping dehydrated kaolinite in water before subjecting the dehydrated kaolinite to the action of the high pressure saturated steam, samples of dehydrated Georgia kaolinite (less than 1% water of crystallization, about 0.2% F.M.) were rehydrated to about 11% water of crystallization by three different procedures hereinafter set forth:

(1) *Rehydration of metakaolin to about 11% water of crystallization in accordance with this invention.*—Kaolin calcined at 700° C. was pulverized in a high speed hammer mill and calcined at 700° C. for 4 hours to 0.2% water of crystallization. The metakaolin was cooled and agitated with water to form a slip containing 33⅓% metakaolin by weight. 30 grams of the 33⅓% solid slip was placed in a 400 ml. high silica (Vycor) test tube. One hundred ml. of distilled water were placed in the bottom of a 1100 cc. capacity autoclave and the tube containing the slipped metakaolin was placed upright in the autoclave, being supported above the liquid in the autoclave by the bottom wall of the autoclave. The autoclave was closed and heated to a pressure of 400 p.s.i.g. by electrically heating the vessel. The pressure was maintained at 400 p.s.i.g. for 24 hours.

(2) *Rehydration of metakaolin to about 11% water of crystallization in saturated steam without slipping the clay.*—120 ml. of distilled water was placed in the bottom of the 1100 cc. autoclave followed by the 400 ml. Vycor test tube containing 10 grams of pulverized metakaolin having a free moisture content below 1%. Without adding water to the test tube, the autoclave was brought to a pressure of 800 p.s.i.g. and maintained at this pressure for 6 hours.

(3) *Rehydration of metakaolin to about 11% water of crystallization with superheated steam.*—30 grams of a 33⅓% solids slip of the metakaolin was placed in the Vycor test tube and added to the autoclave containing 100 ml. of distilled water. The slip was bombed with superheated steam at 600° F. and 1000 p.s.i.g. for 60 minutes. The results are summarized in Table IV.

Table IV

EFFECT OF SLIPPING METAKAOLIN AND STEAM QUALITY ON THE PROPERTIES OF METAKAOLIN REHYDRATED AT ELEVATED PRESSURE TO ABOUT 11% WATER OF CRYSTALLIZATION

| Run No. | Metakaolin slipped before autoclaving | Steam quality | B.E.T. surface area, m.²/g. | Water of crystallization, percent | 12.5°2θ line intensity |
| --- | --- | --- | --- | --- | --- |
| 1 | Yes | Saturated | 322 | 11.2 | 14 |
| 2 | No | do | 57.6 | 11.2 | 46 |
| 3 | Yes | Superheated | 59.6 | 10.6 | |

The data for Run No. 1 in Table IV show that metakaolin rehydrated, in accordance with this invention, to about 11% water of crystallization in the form of an aqueous slip with saturated steam had an exceptionally high B.E.T. surface area of 322 m.²/g., more than a twenty-fold increase over the surface area of the kaolin from which the rehydrated material was obtained. In contrast, when the metakaolin was rehydrated to about the same water content without slipping the metakaolin, the surface area of the rehydrated product was only 57.6% m.²/g., about ⅙ the surface area of the aluminum silicate obtained in accordance with this invention. Likewise, using superheated steam with slipped metakaolin, the desired high surface area product was not obtained and a product having a surface area of only 59.6 m.²/g. was produced.

These data therefore demonstrate that a high surface area aluminum silicate is not inherently formed from dehydrated kaolinite by rehydrating the pulverized dehydrated clay material to an amount within the 10% to 12% water of crystallization level. To the contrary, these data indicate that the steam must be saturated and, further, that the dehydrated clay must be in direct contact with liquid water during the steam treatment.

Data in Table IV for the first order basal reflection of various aluminum silicates (generally indicating the extent of kaolinite crystallinity in the products) indicate that, of the various aluminum silicates rehydrated to about 11% water of crystallization with saturated steam, the aluminum silicate of this invention had by far the smallest amount of crystal structure.

EXAMPLE VI

The effect of mechanical pressure prior to rehydration on the properties of rehydrated clays was studied.

The pressing experiments were conducted by weighing into the 1-inch diameter die of a Carver press a 10 gram sample of the raw or calcined kaolin. The desired pressing pressure was then obtained and this pressure maintained on the cake for 30 seconds before being released. In some cases where higher cake densities were desired, the samples were moistened slightly before pressing.

Rehydration studies were carried out at saturated steam pressure of 1600 p.s.i.g. Samples were rehydrated at 33⅓% metakaolin solids in the 1100 cc. capacity vessel in Vycor test tubes. Ten grams of solids and 20 grams of distilled water were placed in each tube and six tubes rehydrated simultaneously. The heat-up rate of the unit was approximately 4 hours and operating pressure was maintained for 2 hours prior to shutting off the power.

Cakes were prepared by pressing at different pressures metakaolin produced by calcining Georgia kaolin clay for 4 hours at 700° C. Other cakes were prepared by pressing the same kaolin clay and calcining the pressed cakes at 700° C. for 4 hours.

Surface areas of test specimens were determined by the B.E.T. nitrogen adsorption method with the results tabulated in Table V.

*Table V*

THE EFFECT OF MECHANICAL PRESSURE PRIOR TO REHYDRATION ON THE PROPERTIES OF REHYDRATED METAKAOLIN

| Mechanical pressure applied, p.s.i.g. | Pressed before calcining at 700° C./4 hrs. | | | Pressed after calcining at 700° C./4 hrs. | | |
|---|---|---|---|---|---|---|
| | Cake density, g./cm.³ | H₂O of cryst., percent | Surface area, m.²/g. | Cake density, g./cm.³ | H₂O of cryst., percent | Surface area, m.²/g. |
| 0 | | 12.6 | 89 | | | |
| 200 | 1.08 | 11.4 | 143 | | | |
| 400 | 1.16 | 12.0 | 178 | | | |
| 600 | 1.30 | 10.5 | 225 | | | |
| 800 | 1.41 | 10.1 | 233 | | | |
| 1,000 | 1.47 | 10.5 | 212 | | | |
| 1,000 | 1.37 | 8.8 | 181 | 0.76 | 12.3 | 89 |
| 4,000 | 1.51 | 8.6 | 141 | 1.01 | 11.8 | 120 |
| 8,000 | 1.69 | 9.6 | 110 | 1.09 | 10.4 | 210 |
| 16,000 | 2.03 | 9.7 | 80 | 1.16 | 9.5 | 229 |
| 16,000 (dry) | | 10.2 | 73 | | | |
| 16,000 (moist) | | 10.4 | 48 | | | |
| 16,000 (very moist) | | | | 1.47 | 10.0 | 214 |

The results reported in Table V show that rehydrated metakaolin having a surface area of 150 m.²/gm. or more was produced only when water of crystallization was in the range of 8.8% to about 12% and the pressed cake employed in the rehydrating equipment had a cake density of 1.1 to 1.5 gm./cm.³.

Similar results will be obtained using other saturated steam pressures in the rehydration step while selecting rehydration time to incorporate the appropriate amount of water into the pressed metakaolin.

It will be understood that the foregoing detailed examples are illustrative only, for variations and changes may be made in the conditions of the process without departing from the substance of the invention as herein disclosed and defined in the appended claims.

I claim:

1. A method of increasing the surface area of kaolin clay which comprises calcining kaolin clay for a time sufficient to produce dehydrated kaolin clay, cooling the dehydrated kaolin clay to a temperature below about 125° C., and subjecting said dehydrated clay to hydrothermal treatment at a pressure of at least 300 p.s.i.g. at a temperature and for a time selected to produce a partially rehydrated material containing from about 60% to about 85% of the water of hydration of the original kaolin clay and having a 12.5° 2θ basal reflection intensity which is a small fraction of that of kaolin clay.

2. A method of increasing the surface area of kaolin clay which comprises calcining kaolin clay for a time sufficient to produce metakaolin, cooling the metakaolin to a temperature below about 125° C., forming an aqueous slip of said metakaolin, and subjecting said aqueous slip to hydrothermal treatment with saturated steam at a pressure of at least 300 p.s.i.g. for a time selected to produce a partially rehydrated material containing from about 70% to about 85% of the water of hydration of the original kaolin clay and having a 12.5° 2θ basal reflection intensity which is a small fraction of that of kaolin clay.

3. A method of increasing the surface area of kaolin clay which comprises calcining kaolin clay for a time sufficient to produce metakaolin to a temperature below about 125° C., said kaolin clay containing about 13.9% water of crystallization, cooling said metakaolin to a temperature below about 125° C., forming an aqueous slip of said metakaolin, and subjecting said aqueous slip to hydrothermal treatment with saturated steam at a pressure of at least 300 p.s.i.g. for at time selected to produce a rehydrated material whose water of crystallization is within the limits of about 10% to about 12% by weight.

4. A method of increasing the surface area of kaolin clay which comprises calcining kaolin clay for a time sufficient to produce metakaolin, said kaolin clay containing about 13.9% water of crystallization, cooling said metakaolin to a temperature below about 125° C., forming an aqueous slip of said metakaolin, and subjecting said aqueous slip to hydrothermal treatment with saturated steam at a pressure above 500 p.s.i.g. for a time selected to produce a rehydrated material whose water of crystallization is within the limits of about 10% to about 12% by weight.

5. A method of increasing the surface area of kaolin clay which comprises calcining kaolin clay for a time sufficient to produce metakaolin, said kaolin clay containing about 13.9% water of crystallization, cooling said metakaolin to a temperature below about 125° C., forming a 10% to 50% solids aqueous slip of said metakaolin, and subjecting said aqueous slip to hydrothermal treatment with saturated steam at a pressure of at least 300 p.s.si.g. for a time selected to produce a rehydrated material whose water of crystallization is within the limits of about 11.1% to about 11.6% by weight.

6. A method of increasing the surface area of kaolin clay which comprises calcining kaolin clay for a time sufficient to produce metakaolin, said kaolin clay containing about 13.9% water of crystallization, cooling said metakaolin to a temperature below about 125° C., forming a 10% to 50% solids aqueous slip of said metakaolin, and subjecting said aqueous slip to hydrothermal treatment with saturated steam at a pressure of at least 300 p.s.i.g. for a time selected to produce a rehydrated material whose water of crystallization is within the limits of about 11.1% to about 11.6% by weight.

7. A method for treating kaolin clay to produce a high surface area aluminum silicate therefrom which comprises calcining kaolin clay for a time sufficient to produce metakaolin, said kaolin clay containing about 13.9% water of crystallization, cooling said metakaolin to a temperature below about 125° C., forming an aqueous slip of said metakaolin and subjecting said aqueous slip to hydrothermal treatment by heating said slip in an enclosed vessel until a steam pressure of 300 p.s.i.g. to 1600 p.s.i.g. is obtained and maintaining said slip under said pressure for a time within the range of 0 to 60 hours after saturated steam pressure has been obtained, said time being selected to rehydrate said metakaolin at said steam pressure only to the extent that its water of crystallization is within the limits of 10% to 12% by weight.

8. A method for treating kaolin clay to produce a high surface area aluminum silicate therefrom which comprises calcining kaolin clay for a time sufficient to produce metakaolin, said kaolin clay containing about 13.9% water of crystallization, cooling said metakaolin, to a temperature below about 125° C., forming an aqueous slip of said metakaolin and subjecting said aqueous slip to hydrothermal treatment by heating said slip in an enclosed vessel until a saturated steam pressure within the range of 400 p.s.i.g. to 500 p.s.i.g. is obtained and maintaining said slip under said pressure for a time within the range of 12 to 24 hours so as to rehydrate said metakaolin only to the extent that its water of crystallization is within the limits of about 11.1% to 11.6%.

9. A method for treating kaolin clay to produce a high surface area aluminum silicate therefrom which comprises mechanically compressing kaolin clay to a density of about 1.1 to 1.5 gm./cm.$^3$, said kaolin clay containing about 13.9% water of crystallization, calcining said compressed kaolin clay to convert said clay to metakaolin, cooling said metakaolin to a temperature below about 125° C., and subjecting said compressed metakaolin to hydrothermal treatment with saturated steam at a pressure of 300 p.s.i.g. to 1600 p.s.i.g. for a time within the range of 0 to 60 hours after saturated steam pressure has been obtained, said time being selected to rehydrate said metakaolin at said steam pressure only to the extent that its water of crystallization is within the limits of 8.5% to 12%.

10. A method for treating kaolin clay to produce a high surface area aluminum silicate therefrom which comprises mechanically compressing metakaolin to a density of about 1.1 gm./cm.$^3$, said metakaolin having been obtained by calcination of kaolin clay originally containing about 13.9% water of crystallization, and subjecting said compressed metakaolin cooled to a temperature below about 125° C. to hydrothermal treatment with saturated steam at a pressure of 300 p.s.i.g. to 1600 p.s.i.g. for a time within the range of 0 to 60 hours after saturated steam pressure has been obtained, said time being selected to rehydrate said metakaolin at said steam pressure only to the extent that its water of crystallization is within the limits of 10% to 12%.

11. A rehydrated metakaolin product having a B.E.T. surface area of at least 120 square meters per gram, a methylene blue adsorption value of at least 50%, said product being characterized further by containing from about 60% to 85% of the water of hydration of kaolin clay and having a 12.5°2$\theta$ basal reflection intensity which is a small fraction of that of kaolin clay.

12. A rehydrated kaolin clay product having a B.E.T. surface area of at least about 300 square meters per gram, a water of crystallization of about 11.1% to about 11.6%, a methylene blue adsorption value of at least 80%, said product being further characterized by having a 12.5°2$\theta$ basal reflection intensity which is less than about 10% of that of kaolin clay.

References Cited by the Examiner

Ceramin Abstracts, Am. Cer. Soc., 1958, page 216.

TOBIAS E. LEVOW, *Primary Examiner.*